US011501077B2

(12) United States Patent
Parng et al.

(10) Patent No.: US 11,501,077 B2
(45) Date of Patent: Nov. 15, 2022

(54) SEMANTIC PROCESSING METHOD, ELECTRONIC DEVICE, AND NON-TRANSITORY COMPUTER READABLE RECORDING MEDIUM

(71) Applicant: ASUSTeK COMPUTER INC., Taipei (TW)

(72) Inventors: Tai-Ming Parng, Taipei (TW); Kuo-Feng Luo, Taipei (TW)

(73) Assignee: ASUSTEK COMPUTER INC., Taipei (TW)

(*) Notice: Subject to any disclaimer, the term of this patent is extended or adjusted under 35 U.S.C. 154(b) by 329 days.

(21) Appl. No.: 16/576,903

(22) Filed: Sep. 20, 2019

(65) Prior Publication Data

US 2020/0097549 A1  Mar. 26, 2020

(30) Foreign Application Priority Data

Sep. 26, 2018 (TW) ................................ 107133897

(51) Int. Cl.
*G06F 40/30* (2020.01)
*G06N 20/00* (2019.01)
(Continued)

(52) U.S. Cl.
CPC .......... *G06F 40/30* (2020.01); *G06F 16/9027* (2019.01); *G06F 40/205* (2020.01); *G06F 40/253* (2020.01); *G06N 20/00* (2019.01)

(58) Field of Classification Search
CPC .... G06F 40/30; G06F 40/205; G06F 16/9027; G06F 40/253; G06F 16/322; G06F 40/14;
(Continued)

(56) References Cited

U.S. PATENT DOCUMENTS 6,223,150 B1 * 4/2001 Duan ...................... G10L 15/26
704/277
6,766,320 B1 * 7/2004 Wang .................... G06F 16/313
707/E17.084
(Continued)

FOREIGN PATENT DOCUMENTS

CN    101446941 A    6/2009
CN    102184262 A    9/2011
(Continued)

OTHER PUBLICATIONS

KR Pub No. 20110061788, Translation retrieved from WIPO Patentscope, Feb. 12, 2009.*
(Continued)

*Primary Examiner* — Jialong He
(74) *Attorney, Agent, or Firm* — McClure, Qualey & Rodack, LLP (57) ABSTRACT

A semantic processing method includes the following steps of: segmenting an input sentence into a plurality of lexicons according to a lexicon database, wherein the lexicon table includes a plurality of table blocks, and the table blocks are respectively located at a plurality of levels of the lexicon table; referring one part of speech or a plurality of parts of speech, corresponding to one of the lexicons of the table blocks, in the lexicon database; performing at least one grammar rule for each of the table blocks of the levels according to the part of speech, the plurality of parts of speech, the part of speech sequence or the plurality of part of speech sequences corresponding to the table blocks of the lexicon table; and outputting a parse tree according to the table blocks in the lexicon table that conform to the at least one grammar rule.

16 Claims, 7 Drawing Sheets

(51) Int. Cl.
*G06F 16/901* (2019.01)
*G06F 40/205* (2020.01)
*G06F 40/253* (2020.01)

(58) Field of Classification Search
CPC .... G06F 40/211; G06F 40/237; G06F 40/279; G06F 40/55; G06N 20/00
See application file for complete search history.

(56) References Cited

U.S. PATENT DOCUMENTS

| | | | | |
|---|---|---|---|---|
| 7,548,848 | B1* | 9/2009 | Deb et al. | G06F 7/00 |
| | | | | 704/9 |
| 2002/0102025 | A1* | 8/2002 | Wu | G06F 40/268 |
| | | | | 382/229 |
| 2004/0034525 | A1* | 2/2004 | Pentheroudakis | G06F 40/242 |
| | | | | 704/9 |
| 2004/0167771 | A1* | 8/2004 | Duan | G06F 40/44 |
| | | | | 704/10 |
| 2005/0234707 | A1* | 10/2005 | Luo | G06F 40/211 |
| | | | | 704/9 |
| 2013/0173251 | A1 | 7/2013 | Xiong et al. | |

FOREIGN PATENT DOCUMENTS

| | | | | |
|---|---|---|---|---|
| JP | H07200591 A | * | 4/1995 | ............... G06F 7/00 |
| KR | 20110061788 A | * | 6/2011 | ........... G06F 17/271 |
| TW | I512503 B | | 12/2015 | |

OTHER PUBLICATIONS

JP Pub No. H07200591, Translation retrieved from WIPO Patentscope, Aug. 4, 1995.*
CYK algorithm, [online], www.wikipedia.com, retrieved from "www.archive.org", archived in 2017. (Year: 2017).*

* cited by examiner

SEMANTIC PROCESSING METHOD, ELECTRONIC DEVICE, AND NON-TRANSITORY COMPUTER READABLE RECORDING MEDIUM

CROSS-REFERENCE TO RELATED APPLICATION

This application claims the priority benefit of Taiwan applications serial No. 107133897, filed on Sep. 26, 2018. The entirety of the above-mentioned patent application is hereby incorporated by reference herein and made a part of specification.

BACKGROUND OF THE INVENTION

Field of the Invention

The present invention relates to a language processing method, and more particularly, to a semantic processing method, an electronic device, and a non-transitory computer readable recording medium.

Description of the Related Art

In the technical field of natural language, linguistics and artificial intelligence are combined in application. When a sentence or an article is input, the sentence is deconstructed by linguistics first. The sentence is analyzed to obtain smaller units, that is, lexicons, and then, the semantic role of each lexicon is tagged. In general, the processing system uses a statistical database to tag the semantic roles, so a well-trained corpus database is important. However, a lexicon often has more than one parts of speech. For a sentence with a lexicon which uses a relatively low probability of part of speech, if use statistical values, such as the most common part of speech of a lexicon, to determine the part of speech of a lexicon and tag it, the sentence may be parsed incorrectly, and the wrong parsing result may be output.

BRIEF SUMMARY OF THE INVENTION

It is an objective of the present disclosure to provide a semantic processing method that produces a correct parse tree and increases the correctness of the parsing result.

According to the first aspect of the disclosure, a semantic processing method applied to an electronic device is provided. The semantic processing method includes the following steps Of: segmenting an input sentence into a plurality of lexicons according to a lexicon database, wherein each of the lexicons includes a single word or a plurality of adjacent words; establishing a lexicon table, wherein the lexicon table includes a plurality of table blocks, and the plurality of the table blocks are respectively located at a plurality of levels of the lexicon table, the number of the table blocks of the levels decreases level by level, and each of the table blocks includes the single word of the lexicon or the plurality of adjacent words of the lexicon; referring one part of speech or a plurality of parts of speech, corresponding to one of the lexicons of the table blocks, in the lexicon database, or referring one part of speech sequence or a plurality of part of speech sequences, corresponding to of the plurality of lexicons of table blocks, in the lexicon database; performing at least one grammar rule for each of the table blocks of the levels according to the part of speech, the plurality of parts of speech, the part of speech sequence or the plurality of part of speech sequences corresponding to the table blocks of the lexicon table; and outputting a parse tree according to the table blocks in the lexicon table that conform to the at least one grammar rule, the parse tree includes meanings of lexicons in the input sentence and a sentence behavior of the input sentence.

According to the second aspect of the disclosure, an electronic device is provided. The electronic device comprises: a storage medium, storing at least one program instruction and a lexical database; an input and output interface, for obtaining an input sentence; and a processor, coupled to the storage medium and the input and output interface, the processor is configured to load and performing the at least one program instruction stored in the storage medium, the processor performs the following steps: segmenting an input sentence into a plurality of lexicons according to a lexicon database, wherein each of the lexicons includes a single word or a plurality of adjacent words; establishing a lexicon table, wherein the lexicon table includes a plurality of table blocks, and the plurality of the table blocks are respectively located at a plurality of levels of the lexicon table, the number of the table blocks of the levels decreases level by level, and each of the table blocks includes the single word of the lexicon or the plurality of adjacent words of the lexicon; referring one part of speech or a plurality of parts of speech, corresponding to one of the lexicons of the table blocks, in the lexicon database, or referring one part of speech sequence or a plurality of part of speech sequences, corresponding to of the plurality of lexicons of table blocks, in the lexicon database; performing at least one grammar rule for each of the table blocks of the levels according to the part of speech, the plurality of parts of speech, the part of speech sequence or the plurality of part of speech sequences corresponding to the table blocks of the lexicon table; and outputting a parse tree according to the table blocks in the lexicon table that conform to the at least one grammar rule, the parse tree includes meanings of lexicons in the input sentence and a sentence behavior of the input sentence.

According to the third aspect of the disclosure, a non-transitory computer readable recording medium is provided. The non-transitory computer readable recording medium, the non-transitory computer readable recording medium records a program instruction, and the program instruction is loaded into the electronic device to perform the following steps: segmenting an input sentence into a plurality of lexicons according to a lexicon database, wherein each of the lexicons includes a single word or a plurality of adjacent words; establishing a lexicon table, wherein the lexicon table includes a plurality of table blocks, and the plurality of the table blocks are respectively located at a plurality of levels of the lexicon table, the number of the table blocks of the levels decreases level by level, and each of the table blocks includes the single word of the lexicon or the plurality of adjacent words of the lexicon; referring one part of speech or a plurality of parts of speech, corresponding to one of the lexicons of the table blocks, in the lexicon database, or referring one part of speech sequence or a plurality of part of speech sequences, corresponding to of the plurality of lexicons of table blocks, in the lexicon database; performing at least one grammar rule for each of the table blocks of the levels according to the part of speech, the plurality of parts of speech, the part of speech sequence or the plurality of part of speech sequences corresponding to the table blocks of the lexicon table; and outputting a parse tree according to the table blocks in the lexicon table that meet the at least one grammar rule, the parse tree includes meanings of lexicons in the input sentence and a sentence behavior of the input sentence.

Compared with the prior arts, the semantic processing method, the electronic device, and the non-transitory computer readable recording medium of the embodiments of the present disclosure generate a correct parse tree and increase the correctness of a parsing result.

These and other features, aspects and advantages of the present disclosure will become better understood with regard to the following description, appended claims, and accompanying drawings.

BRIEF DESCRIPTION OF THE DRAWINGS

The detailed description below will facilitate a better understanding of the various aspects of the disclosure with reference with the figures. It should be noted that the features in the drawings are not necessarily drawn proportionally according to the requirements of the practice described above. In fact, for the sake of clarity, the size of each feature may be arbitrarily increased or reduced.

DETAILED DESCRIPTION OF THE EMBODIMENTS

The following disclosure provides many different embodiments or examples in order to implement various features of the disclosure. The specific examples disclosing the elements and arrangements are used to simplify the disclosure. Of course, the above examples are merely exemplary and are not intended to be limiting. For example, in the following disclosure, a description of a first feature formed over a second feature or on the second feature includes an embodiment that a first feature and a second feature are direct contacted, and further includes an embodiment that an additional feature between the first feature and the second feature exists and the first feature and the second feature are not directly contacted. Furthermore, the present disclosure may repeat element symbols and/or letters in various examples. This repetition is for the purpose of brevity and clarity and does not indicate the relationship between the various embodiments and/or configurations discussed.

Furthermore, for ease of description, the spatially relative terms (such as "under", "below", "lower", "above", "higher") are used herein to describe the relationship between one element/feature and another element (or elements)/feature (or features) in the figures. In addition to the orientation disclosed in the figures, the spatially relative terms include different orientations of the device in use or operation. The device may be oriented in other way (rotated 90 degrees or in other orientations) and therefore the spatially relative terms are also interpreted in the embodiments of the disclosure.

In general, a semantic processing method needs to use a parser to analyze the meaning and role of each lexicon in a sentence. The parser, which uses a statistical method to train its model, generally trains a structure tree data of a treebank to obtain a model, and then uses the model to analyze a new sentence. Therefore, if it is a very complicated sentence or a tree that rarely appears in the treebank, the analysis fails. On the other hand, when it fails, it is not easy to correct the sentence that is misanalysed, as the parser in this way must augment the treebank or modify the algorithm, and then retrain a new model for testing. Therefore, the resources required are very large and the errors encountered may not be corrected.

The parser, which uses grammar rules as a criterion, is generally loosely designed on the grammar rules in order to maintain the probability that sentences pass the parsing (in accordance with at least one of the grammar rules). Since the criterion of the grammar rules is relatively loose, the disambiguation structure of the sentence cannot be accurately identified. For example, a same sentence may pass two or more grammar rules at the same time, and it is difficult to confirm the most suitable grammatical structure.

In order to solve the problem of passing a plurality of the grammar rules at same time, a semantic processing method 100 of embodiments of the present disclosure is a feature-based parser, and the ability to solve syntactic ambiguities is better than that of the general parser.

In addition, generally, an input content received by the parser is a sentence input by a user, and after a lexicon segmenting and a part of speech determining processes, the combination of the highest score is obtained. However, the lexicon segmenting result of the highest score may be not the correct combination, and the correct combination may be at the second or the third high score. Moreover, the tag of the part of speech is usually get from a model obtained from a training corpus. If a lexicon appears in the corpus mostly as a verb, the model will tag it as a verb when tagging the lexicon. However, in some contexts, the lexicon may be used as an adjective or other parts of speech, but it is tagged as a verb because of the probability distribution of the parts of speech. Therefore, most of the parser often encounter a situation in which the determination of the part of speech is wrong, which directly leads to the failure of its parsing. If parsing with a wrong tagging result, it inevitably causes the parsing of the sentence failed.

In order to solve the problem, the semantic processing method 100 of the embodiments of the present disclosure accept multiple sets of lexicon segmenting results into the parser at one time and the lexicon segmenting result does not have to have a single fixed part of speech determine tag. The parser considers all the part of speech determine tags of a lexicon that exist in the lexical database, and finally use the grammatical restrictions to filter out the correct part of speech tags.

Figure 1:
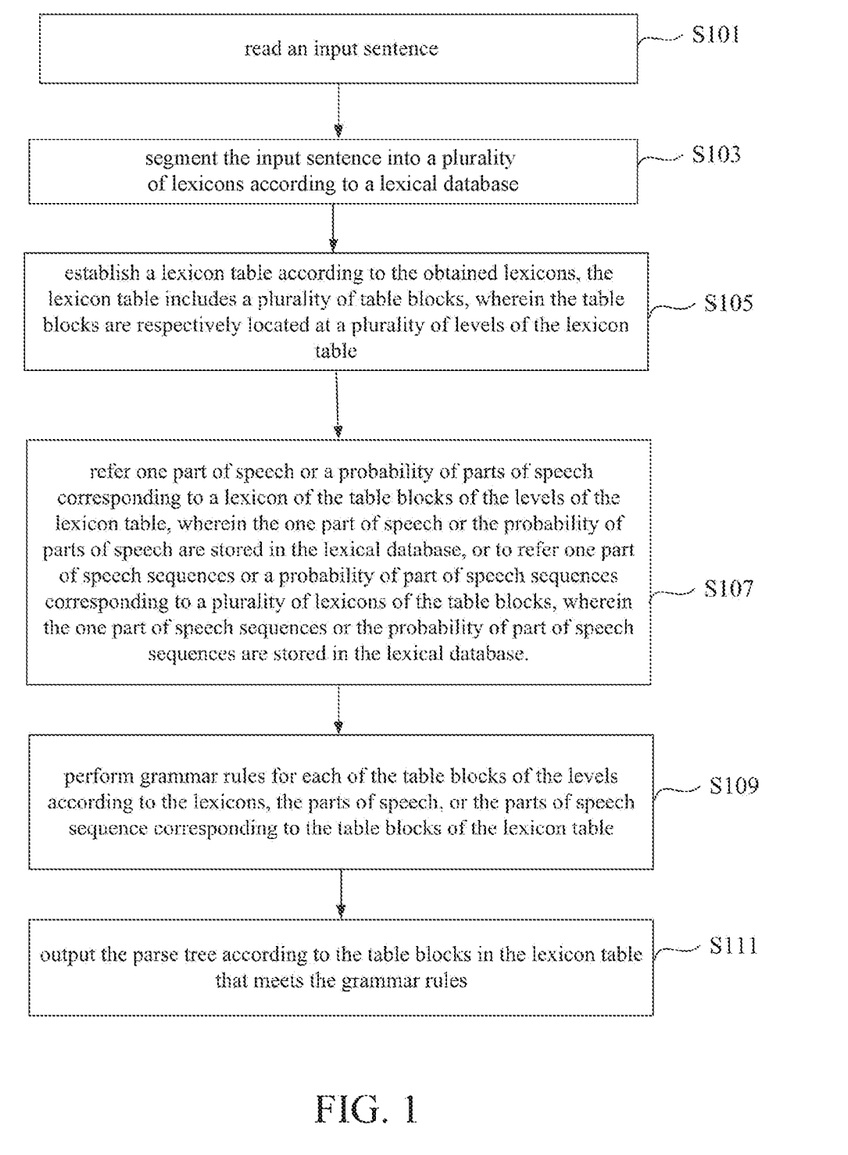
FIG. 1 is a flow diagram of a semantic processing method according to some embodiments of the present disclosure.

FIG. 1 is a flow diagram of a semantic processing method according to some embodiments of the present disclosure. The semantic processing method 100 of the embodiment is used to parse a piece of text or an article into a combination of sentence segments that are contextually fluent and conform to grammar rules of the language. In some embodiments, the semantic processing method 100 is performed by a processing element which reads program instructions stored in a recording unit.

Please refer to FIG. 1. First, step S101 is performed to read an input sentence. The input sentence is in Chinese or in English. Taking a Chinese sentence as an example, the input sentence is "ni yao bu yao gen wo qu fu li she". Taking an English sentence as an example, the input sentence is "What shall we do supposing it rains". In other examples, the input sentence is a short/medium/long article or a piece of text that is converted into a textual narrative via speech recognition process.

In step S103, the input sentence is segmented into a plurality of lexicons according to a lexical database, to obtain all the meanings of each lexicon collected in the lexical database. During the segmenting process, the language family of the input sentence is first determined, and a corresponding lexical database is selected according to the language family. In an embodiment, the input sentence is "zhang ke yuan bei mian zhi le", and the lexical database records a collection of words {zhang, ke, yuan, bei, mian, zhi, le}, so the input sentence is segmented into multiple lexicons "zhang/ke/yuan/bei/mian/zhi/le" ("/" is for separating lexicons). Or, in another case, the lexical database records a collection of phrases {ke yuan, mian zhi}, so the input sentence is segmented into multiple lexicons "zhang/ke yuan/bei/mian zhi/le". The database for segmenting the input sentence, is but not limited to, a vocabulary database built on statistical or vocabulary usage habits.

In an embodiment, the "lexicon" described in the present disclosure is a word or a phrase composed of two or more adjacent words. Therefore, an input sentence is segmented to generate one or more lexicon combinations. According to the described above, the segmenting result may be a lexicon combination such as "zhang/ke/yuan/bei/mian/zhi/le" or another lexicon combination such as "zhang/ke/yuan/bei/mian/zhi/le" and "zhang/ke yuan/bei/mian zhi/le". The lexicon combinations that will be used in subsequent steps are retained depending on the actual situation in the embodiments of the present disclosure. If two or more lexicon combinations are selected, subsequent steps are performed on each of the lexicon combinations.

Then, step S105 is performed to establish a lexicon table according to the obtained lexicons. The lexicon table includes a plurality of table blocks, and the table blocks are respectively located at a plurality of levels of the lexicon table. Each level has the table blocks, and the number of the table blocks for each level decreases as the level increases. The lexicon table is a CYK (Cocke-Younger-Kasami) table, and the semantic processing method is implemented using the lexicon segmenting logic and the grammar parsing of the embodiments of the present disclosure. To specifically describe the contents of the lexicon table, the following is described in detail with reference to FIG. 2A.

Figure 2A:
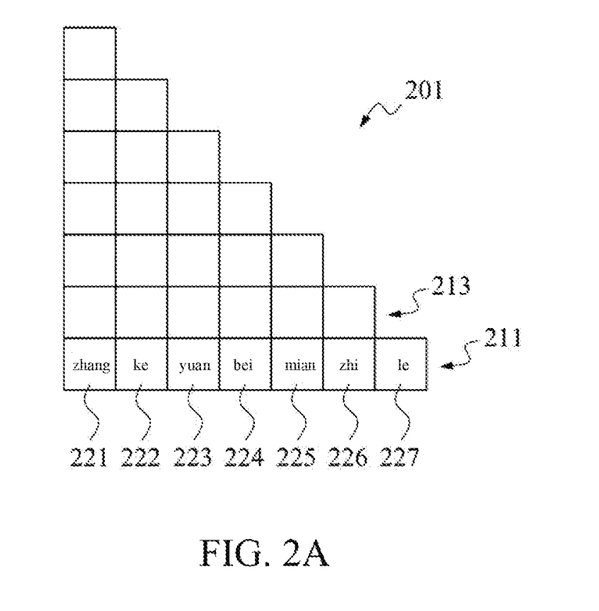
FIG. 2A is a schematic diagram of a lexicon table according to some embodiments of the present disclosure.

FIG. 2A is a schematic diagram of a lexicon table according to some embodiments of the present disclosure. As shown in FIG. 2A, the lexicon table 201 includes a level 211, a level 213, and other higher levels. The lexicon table 201 in FIG. 2A includes seven levels. The level 211 includes seven table blocks 221-227. The level 213, which is one step higher than the level 211, includes six table blocks. By analogy, the higher the level includes fewer the table blocks (Ex. only one table block is included in the seventh level).

Continuing to step S105, each of the table blocks includes a single word or adjacent words of the input sentence. In the embodiment where each of the table blocks includes a word, such as "zhang/ke/yuan/bei/mian/zhi/le", each of the table blocks 221-227 of the lowest level 211 is filled in a word respectively. That is, the corresponding word of the table block 221 is "zhang", the corresponding word of the table block 222 is "ke", the corresponding word of the table block 223 is "yuan", the corresponding word of the table block 224 is "bei", the corresponding word of the table block 225 is "mian", the corresponding word of the table block 226 is "zhi", and the corresponding word of the table block 227 is "le", as shown in FIG. 2A.

Figure 2B:
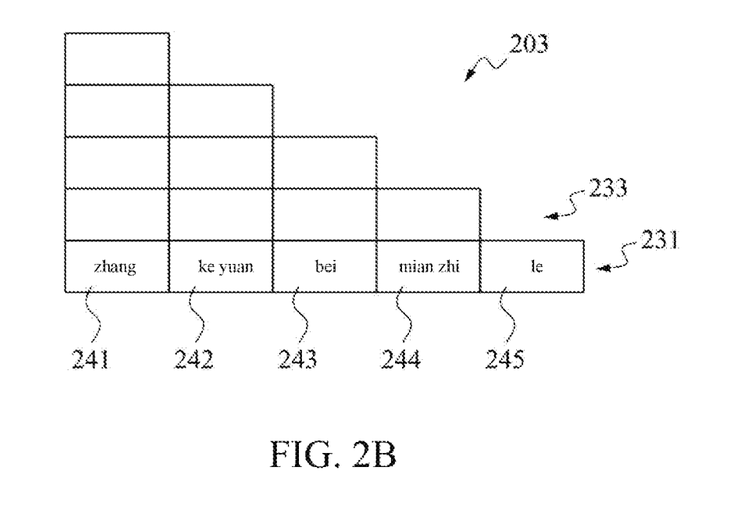
FIG. 2B is a schematic diagram of a lexicon table according to other embodiments of the present disclosure.

To specifically describe the contents of a lexicon table, the following is described in detail with reference of FIG. 2B. FIG. 2B is a schematic diagram of the lexicon table according to other embodiments of the present disclosure. The lexicon table 203 includes a level 231, a level 233, and other higher levels. The lexicon table 203 as shown includes five levels. The level 231 includes five table blocks 241-245. The level 233, which is one step higher than the level 231, includes four table blocks. By analogy, the higher the level includes fewer the table blocks (there is only one table block in the fifth level). In the case where at least one of the table blocks contains a plurality of adjacent words, such as "zhang/ke yuan/bei/mian zhi/le". As shown in FIG. 2B, the table blocks 241-245 of the lowest level 231 is filled with lexicons with the single word or the adjacent words respectively, that is, the corresponding lexicon of the table block 241 is "zhang", and the corresponding lexicon of the table block 242 is "ke yuan", the corresponding lexicon of the table block 243 is "bei", the corresponding lexicon of the table block 244 is "mian zhi", and the corresponding lexicon of the table block 245 is "le".

In other words, when the table block includes multiple adjacent words, the number of lexicons is reduced in advance. Therefore, when the lexicon table is created, unnecessary lexicons is excluded in advance, and the size of the lexicon table is reduced. In this way, the lexicon combinations that are not considered are excluded in advance, and the lexicon table can avoid unnecessary computational cost in the subsequent parsing process of the grammar rules. Taking FIG. 2A and FIG. 2B as an example, the lexicon table of FIG. 2A needs a size of 7*7, and the lexicon table of FIG. 2B only needs a size of 5*5. Therefore, FIG. 2B saves the computational cost and the storage space of the lexicon table compared to FIG. 2A when the higher-level lexicon combinations of FIG. 2B are parsed of the grammar rules.

Please continue to refer to FIG. 1. In this stage, the lexicons in the lexicon table are not set with fixed parts of speech, but considered the different parts of speech of each lexicon when each lexicon is in different meanings. For example, the probability of that a lexicon is a noun in a first lexicon meaning is 80%, the probability of that the lexicon is a verb in a second lexicon meaning is 15%, and the probability of that the lexicon is an adjective in a third lexicon means is 5%. In other words, even if the probability of that the lexicon is a noun is 80% is higher than the probability of that the lexicon is a verb is 15%, all the part of speech (such as a noun, a verb, and an adjective) and meanings of each lexicon in the lexicon table is considered. Then, step S107 is performed to refer one part of speech or a probability of parts of speech corresponding to a lexicon of the table blocks of the levels of the lexicon table, wherein the one part of speech or the probability of parts of speech are stored in the lexical database, or to refer one part of speech sequences or a probability of part of speech sequences corresponding to a plurality of lexicons of the table blocks, wherein the one part of speech sequences or the probability of part of speech sequences are stored in the lexical database. In addition, Each of the lexicons has one or more parts of speech, and each part of speech has a corresponding probability of use.

Figure 3A:
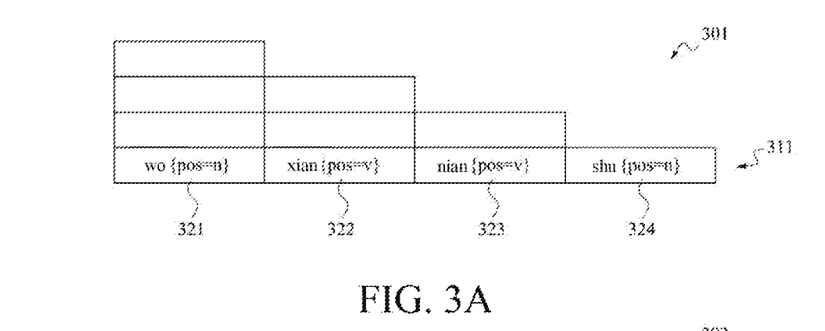
FIG. 3A is a schematic diagram of a lexicon table in accordance with some embodiments of the present disclosure.

In detail, after determining the size of the lexicon table and generating corresponding lexicon of each table block, further refer one part of speech or a probability of parts of speech corresponding to each lexicon to record the one part of speech or the probability of parts of speech corresponding to each lexicon in the table block. For the step flows of FIG. 1, referring the part of speech corresponding to the lexicon of the table block in the lexicon table shown in FIG. 3A. Please refer to FIG. 3A. The input sentence is "wo xiang nian shu", and a lexicon table 301 is obtained through the aforementioned step S103 of FIG. 1. The lexicon table 301 includes a level 311. The level 311 includes a plurality of lexicons 321-324. In this embodiment, each of the table blocks of the lexicon table 301 includes a lexicon with a single word. That is, the corresponding lexicon of the table block 321 is "wo", the corresponding lexicon of the table block 322 is "xiang", the corresponding lexicon of the table block 323 is "nian", and the corresponding lexicon of the table block 324 is "shu". Then, determine which of the part of speech (POS) is corresponding to each lexicon of the table blocks 321-324 respectively. As shown in FIG. 3A, the part of speech of the lexicon of the table block 321 is a noun (pos=n) (for example, the probability of use is 100%), and the part of speech of the block of the table block 322 is a verb (pos=v) (for example, the probability of use is 70%), the part of speech of the lexicon of the table block 323 is a verb (pos=v) (for example, the probability of use is 75%), and the part of speech of the lexicon of the table block 324 is a noun (pos=n) (for example, the probability of use is 80%). In addition, each lexicon of the table block may have more than one part of speech, for example, the POS of the lexicon "book" of the table block 324 can be a noun or a verb (for example, the probability of use is 20%). When the POS of the lexicon "book" is a verb, it is used to describe the action of writing. In this case, the part of speech of the table block 324 is a noun or a verb. That is to say, at this stage, the lexicon table considers all the parts of speech of the lexicons, but does not tag each lexicon with a specific POS (for example, the lexicon table does not tag the POS of a lexicon based on the high using probability of the POS), instead, the lexicon table determines the correct POS tags based on the subsequent grammar parsing process. In this way, the parser reduces to generate a result with wrong grammar and outputs a more correct semantic sentence. Moreover, it also solves the problem that a result with wrong grammar is generated as parsing by the most commonly used part of speech of a lexicon, in the situation that a lexicon has some uncommon part of speech but which is correct in grammar in some cases. In the method provided by the embodiments of the present disclosure, the parts of speech of the same lexicon that are not often used are included in the reference.

Figure 3B:
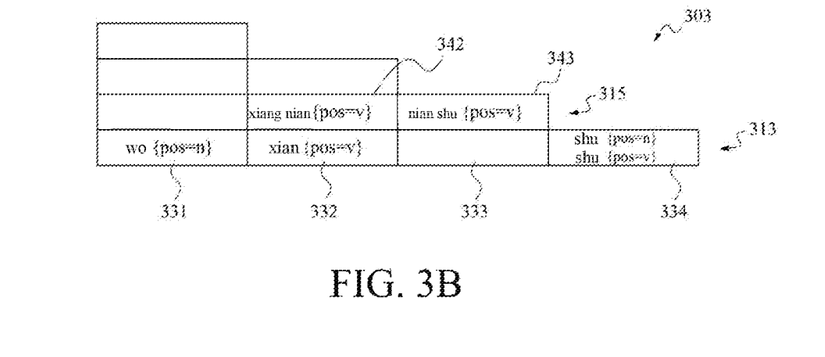
FIG. 3B is a schematic diagram of a lexicon table according to other embodiments of the present disclosure.

For the step flows of FIG. 1, please refer to FIG. 3B, the input sentence is "wo xiang nian shu". The semantic processing method 100 retains lexicon combinations according to the actual situation. As shown in FIG. 3B, the lexicon table 303 includes a level 313 and a level 315. The level 313 includes table blocks 331 to 334, and the level 315 includes table blocks 342-343. The corresponding lexicon of the table block 331 is "wo", the corresponding lexicon of the table block 332 is "xiang", the corresponding lexicon of the table block 334 is "shu", and the table block 333 is left blank. The semantic processing method 100 determines that two phrases of "xiang nian" and "nian shu" are possible used when parsing the phrases related to "nian", therefore, the two phrases are both retained and recorded in the level 315 which higher than the level 313. As shown in FIG. 3B, the corresponding phrase of the table block 342 of the level 315 is "xiang nian" and the corresponding phrase of the table block 343 is "nian shu". Meanwhile, the part of speech of the lexicon of the table block 331 is a noun (pos=n), the part of speech of the lexicon of the table block 332 is a verb (pos=v), and the parts of speech of the part of the table block 334 is a noun (pos=n) and the verb (pos=v), and the table block 333 does not have a corresponding lexicon. In this way, two or more possible phrases are retained, and the retained phrases are entered into the parser in the subsequent grammar parsing process. Compared to determining a lexicon segmenting result from the beginning, this method avoids error in the subsequent grammatical parsing process.

Figure 4:
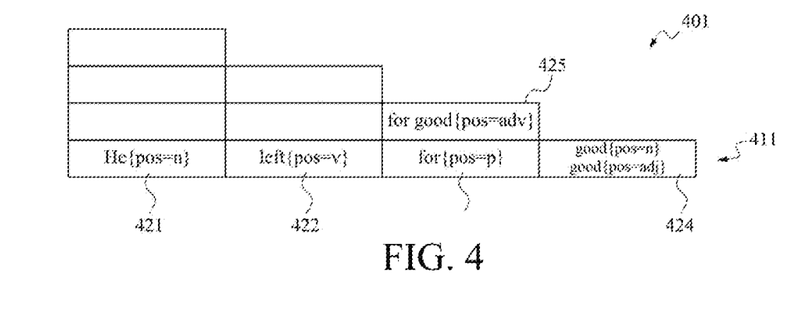
FIG. 4 is a schematic diagram of a lexicon table according to some embodiments of the present disclosure.

FIG. 4 is a schematic diagram of a lexicon table according to some embodiments of the present disclosure. The lexicons and parts of speech of the input sentence "He left for good" are shown in FIG. 4. Referring to FIG. 4, the lexicon table 401 includes a level 411. The lexicons "He", "left", "for", and "good" are obtained from the input sentence. "for good" is a phrase that is possibly used, if this phrase is not considered, it is likely to produce erroneous results in the grammar parsing process. As shown in FIG. 4, the lexicon of the table block 421 is "He", the lexicon of the table block 422 is "left", the lexicon of the table block 423 is "for", and the lexicon of the table block 424 is "good". In order to make the phrase "for good" also enter the grammar parsing process, the phrase "for good" is also filled in the table block 425 of the level higher than the level 411. In addition, each lexicon of the table blocks may have more than one parts of speech. For example, the lexicon "good" of the table block 424, besides being a noun, may also be used as an adjective to describe "good, beneficial". In this case, the part of speech read by the table block 424 includes a noun and an adjective. That is, as shown in FIG. 3A, FIG. 3B, and FIG. 4, the lexicons of the table blocks of the lexicon table 301, the lexicon table 303, and the lexicon table 401 established by the semantic processing method 100 may have multiple meanings, and each meaning of the above-mentioned lexicons may have different parts of speech correspondingly. Therefore, the lexicons in the table blocks are not limited to one part of speech, all the possible parts of speech of the lexicon are considered in the subsequent grammar rules.

Please continue to refer to FIG. 1, and then proceed to step S109 to perform grammar rules for each of the table blocks of the levels according to the lexicons, the parts of speech, or the parts of speech sequence corresponding to the table blocks of the lexicon table. The performing of the grammar rules in the semantic processing method is explained below. In some embodiments, the semantic processing method of the lexicon table analyzes the corresponding lexicons and the part of speech of the table block from left to right and from bottom to top in the lexicon table.

In some embodiments, the grammar rules of the semantic processing method include segmenting the input sentence into a plurality of lexicons, and placing a preset phrase in one of the table blocks of the table when determining that the input sentence has at least one preset phrase, wherein the preset phrase includes more than two words.

Figure 5:
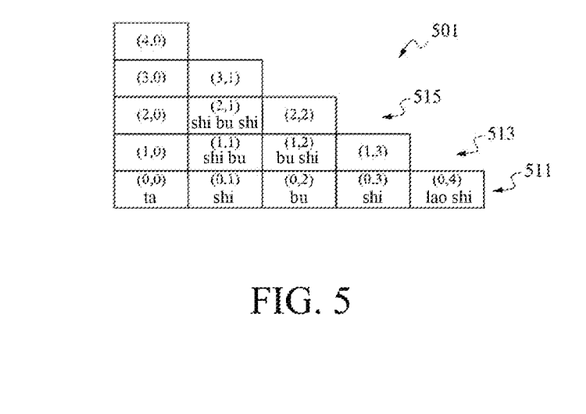
FIG. 5 is a schematic diagram of performing a grammar rule according to some embodiments of the present disclosure.

FIG. 5 is a schematic diagram of performing a grammar rule according to some embodiments of the present disclosure. The grammar rule of the embodiments considers the relationship between lexicons and lexicons, and feature rules. If a plurality of lexicons can be combined, the lexicons are combined into one new lexicon when the grammar rule is performed, and the new lexicon is configured to replace the lexicons. In the grammar parsing process, the sentence is performed grammar parsing based on the new lexicon. Referring to FIG. 5, the input sentence is "ta shi bu shi lao shi". As step S103 shown in FIG. 1, according to the lexical database, the input sentence of "ta shi bu shi lao shi" is segmented into five lexicons: "ta", "shi", "bu", "shi", and "lao shi". In this embodiment, the lexicon "shi bu shi" is a preset phrase. Therefore, as shown in the lexicon table 501 of FIG. 5, the table block (0, 0) of the level 511 is filled with "ta", the table block (0, 1) is filled with "shi", the table block (0, 2) is filled with "bu", the table block (0,3) is filled with "shi", the table block (0,4) is filled with "lao shi". Next, it is determined whether at least one of the combinations of the adjacent lexicons of the first level 511 includes the preset phrases. The combinations of two adjacent lexicons of the first level 511 are "shi bu" and "bu shi". In the embodiment, after determine that "shi bu" and "bu shi" do not include the preset phrase "shi bu shi", the lexicon of the table block and the lexicon of the adjacent table block of the previous level 511 are filled in the next level 513. As shown in FIG. 5, the lexicon of the table block (1, 1) of the level 513 includes the lexicon of the table block (0, 1) and the lexicon of the table block (0, 2) of the previous level 511, therefore, the lexicon "shi bu" is filled in the table block (1, 1) of the level 513. Moreover, the lexicon of the table block (1, 2) of the level 513 includes the lexicon of the table block (0, 2) and the lexicon of the table block (0, 3) of the previous level 511, and thus the lexicon "bu shi" is filled in the table block (1,2) of the level 513.

Following the previous description, it is determined whether the combination of adjacent lexicons of the level 513 includes the preset phrase "shi bu shi". In this case, since the combination of adjacent lexicons of the level 513 includes the preset phrase, the preset phrase "shi bu shi" is filled in the table block (2, 1) of the level 515. When the preset phrase "shi bu shi" as the lexicon exists in the lexicon table 501, the lexicon "shi bu shi" is selected to segment the input sentence "ta shi bu shi lao shi". Then, the lexicons "shi", "bu", "shi", "shi bu", "bu shi" in the table block (0, 1), the table block (0,2), the table block (0,3), the table block (1,1), and the table block (1, 2) are deleted. In the subsequent grammar rules, the other table blocks are no longer the combination of these lexicons such as "ta shi bu", "bus hi lao shi" and so on.

In this way, the combinations of the lexicons of the lexicon table are instantly adjusted, and unnecessary combinations of the lexicons are deleted, thereby the amount of computation of the parse tree in the future is reduced.

In some embodiments, one grammar rule of the semantic processing method includes determining whether a P node exists, and when the P node exists, the current grammar rule is temporarily passed. Furthermore, after determining the P node exists and the current grammar rule was temporarily passed Then, when a node lexicon of the P node is read in another grammar rule, the previously passed grammar rule is performed to determine whether the node lexicon of the P node conform to the previously passed grammar rule. The details are described below.

Figure 6:
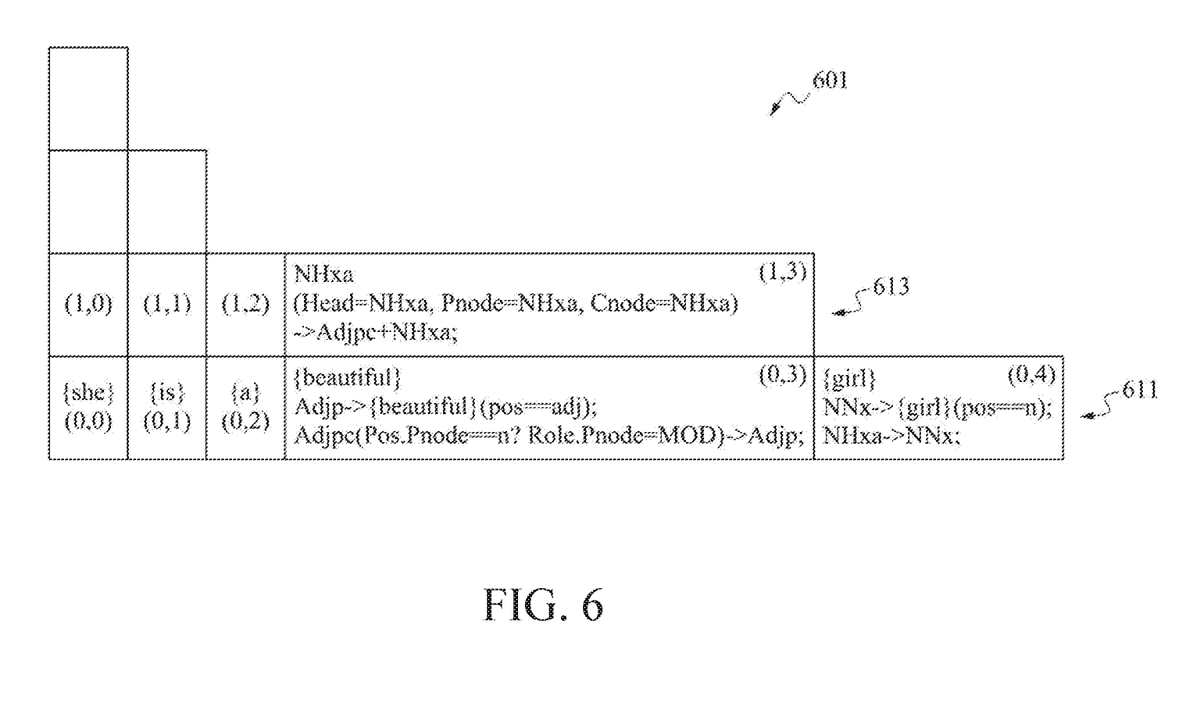
FIG. 6 is a schematic diagram of performing a grammar rules according to some embodiments of the disclosure.

Referring to FIG. 6, a lexicon table 601 includes a level 611 and a level 613. In this embodiment, the input sentence is "She is a beautiful girl". The lexicon of the table block (0,0) of the level 611 is "She", the lexicon of the table block (0,1) is "is", and the lexicon of the table block (0,2) is "a", the lexicon of the table block (0,3) is "beautiful", and the lexicon of the table block (0,4) is "girl". The P node is a data structure in a program code. The following describes how to use the P node to determine which lexicons are conformed to the grammar rule.

As shown in FIG. 6, the lexicon in the table block (0, 3) is "beautiful" whose part of speech is an adjective. The grammar rule: "Adjpc(Pos.Pnode==n?Role.Pnode=MOD)→Adjp;" is performed on this block. In the embodiment, the determining condition in this grammar rule is determining whether the POS of the node lexicon of the P node is a noun. When the POS of the P node lexicon is noun, the feature Role=MOD is assigned to the P node lexicon. Here, "?" is a conditional operator, that is, if the left condition is established, the right function is performed. However, at this time, it is not known what the lexicon and the part of the P node are, and it is impossible to determine whether the grammar rule is conformed. Therefore, the grammar rule is temporarily passed and the determining condition of the P node is kept. Then, the lexicon of the table block (0, 4) is "girl" whose POS is a noun, Then, the grammar rule "NHxa(Head=NHxa, Pnode=NHxa, Cnode=NHxa)→Adjpc+NHxa;" is performed on the table block (1, 3). The node lexicon (NHxa) of the P node is read when performing the grammar rule "NHxa(Head=NHxa, Pnode=NHxa, Cnode=NHxa)→Adjpc+NHxa;", and the grammar rule "Adjpc(Pos.NHxa==n?Role.Pnode=MOD)→Adjp;" is re-performedto determine whether the grammar rule is met. Since the grammar rule is met, the assignment of the semantic role of Role.Pnode=MOD is completed. In other words, the P node is used to determine an unknown lexicon, and therefore the grammar rule "Adjpc(Pos.NHxa==n?Role.Pnode=MOD)→Adjp;" is temporarily passed when determining the P node exists but the node lexicon of the P node is not read. Then, when the node lexicon of the P node is read in another grammar rule, the grammar rule "Adjpc(Pos.NHxa==n?Role.Pnode=MOD)→Adjp;" is performed.

In this way, the present disclosure solves the problem that the meaning of the lexicon cannot be determined immediately but the grammar parse must be performed at the moment. Through the configuration of the P node, the determining condition is kept, and the node lexicon of the P node is allowed to be assigned to the table block at higher levels or later, and the grammar rule of the upper layer is used to re-perform the grammar rule of the P node to complete the assignment of the semantic role of Role.Pnode=MOD, that increases the accuracy of grammar parse and improve the efficiency of building the parse tree.

In some embodiments, the grammar rule of the semantic processing method includes a step of determining whether the POS of the table block on the left side of the table block of each level of the lexicon table corresponds to a preset POS. For example, the grammar rule "Pos.LWord[n]==p" is used to determine whether the POS of the nth lexicon on the left side of the subtree consisting of grammars is p. In another example, the grammar rule "Ltokens==V+N" is a future comparison, which means that the left combination must be V+N when determining that a grammar result will be combined with results of other table blocks in the future. For example, Ltokens==V+N is added in the grammar result of Qword as the future determination. When there is a grammar rule "S→V+N+Qword" is to be performed, the comparison of Ltokens is performed in the Qword, and S is generated when the Ltokens is met.

In some embodiments, the grammar rule of the semantic processing method includes determining whether all of the POS of some specified table blocks of the lexicon table correspond to a preset POS. For example, the input sentence is "ni de tou fa han ta yi yang hao kan", and a lexicon V1 "yi yang" and a lexicon V2 "hao kan" are generated from the input sentence. Then, perform the grammar rule "V(head=V2,_Pos.V1!=adv)→V1(V_type==vh11)+V2 (V_type==vh11);" on the input sentence "ni de tou fa han ta yi yang hao kan". In the determining condition "_Pos.V1!=adv", it is considered whether all the parts of speech (POS) of the lexicon V1 accessing from the lexical database include an adverb (adv). And when it is determined that all the parts of speech of the lexicon V1 do not include an adverb, the determining condition "_Pos.V1!=adv" is met. Since the POS of the lexicon "yi yang" does not include an adverb in the lexical database, the input sentence "ni de tou fa han ta yi yang hao kan" meets the determining condition of the grammar rule. Thus, a part of speech determination of some lexicon is limited to improve the elasticity of grammar analysis.

In some embodiments, the grammar rule of the semantic processing method includes a step of determining whether the POS of the table block on the right side of the table block of the level of the lexicon table corresponds to the preset POS. For example, the grammar rule "Word.RWord[n] ==hao" is used to determine whether the nth lexicon on the right side of the subtree formed by grammars is "hao". In another example, the grammar rule "Rtokens==P+NP" is a future comparison, which means the combination of the right side must be P+NP when determining that the result of this grammar to be combined with the results of other table blocks in the future.

In some embodiments, the grammar rule of the semantic processing method includes determining whether the POS of a lexicon of a specified table block of the lexicon table corresponds to a preset POS, wherein the lexicon of the specified table block and the lexicon of at least one adjacent table block jointly compose a lexicon combination. For example, the grammar rule "Pos.Tokens[−1]==n" is used to determine whether the POS of the last lexicon of the subtree formed by the grammar is a noun.

In some embodiments, the grammar rule of the semantic processing method includes determining whether the POS of the adjacent lexicon adjacent the lexicon of a lexicon block of the lexicon table corresponds to a preset part of speech. When the POS of the adjacent lexicon of corresponds to the preset part of speech, it is determined the adjacent lexicon and the lexicon of the lexicon block of the lexicon table jointly form a phrase. The preset part of speech is a semantic feature of a lexicon, such as an abstract noun or a physical noun. Take the two input sentences "He lost the interest in life.", and "He shook his head in grief." for example. These two sentences have the same sentence structure, but the preposition "in" has two different meanings in the two input sentences. The following two grammar rules is used:

A grammar rule I: "S(Head=VP, fltype.NP==abstract, POfeature.PP==abstract, edge.NP-PP=RANGE)→VP+NP+PP".

A grammar rule II: "S(Head=VP, fltype.NP==physical, POfeature.PP==abstract, edge.VP-PP=RANGE)→VP+NP+PP".

The grammar rule I indicates that when both the left and right sides of the preposition are abstract nouns, the preposition modifies the abstract noun on the left. The grammar rule II indicates that when the left side of the preposition is a physical noun and the right side is an abstract noun, the preposition and the abstract noun jointly form a phrase to modify the verb. In an embodiment, when the two of the input sentences described above are parsed by the grammar rule I and the grammar rule II, the input sentence "He lost the interest in life." meets the grammar rule I, and the input sentence "He shook his head in grief" meets the grammar rule II.

Take the following two input sentences for example: "I eat the pizza with fork.", and "I eat the pizza with pineapple." These two sentences have the same sentence structure, but the preposition "with" has two different meanings in the two input sentences, namely "with fork" and "with pineapple". "I eat the pizza with fork." means using a fork to eat pizza, wherein the phrase "with fork" is used to modify the verb "eat", and "I eat the pizza with pineapple." means the pineapple is on the pizza, wherein the phrase "with pineapple" is used to modify the noun "pizza". Therefore, a preset part of speech is added in the grammar rule to parse the sentences of the same sentence structure. The following two grammar rules is used:

A grammar rule III: "S(Head=VP, type.NP==food, POfeature.PP==comestible, edge.NP-PP=RANGE)→VP+NP+PP".

A grammar rule IV: "S(Head=VP, type.NP==food, POfeature.PP==instrument, edge.VP-PP=RANGE)→VP+NP+PP".

The grammar rule III indicates that when the meaning of a noun on the right side of a preposition is an appliance noun, the preposition and the noun on the right side jointly form a phrase to modify a verb. The grammar rule IV indicates that when the meaning of a noun on the right side of a preposition is a noun of food, the preposition and the noun on the right side jointly form a phrase to modify the noun on the left side. For example, when the two of the input sentences "I eat the pizza with fork.", and "I eat the pizza with pineapple." are parsed by the grammar rule III and the grammar rule IV, the input sentence "I eat the pizza with fork." meet the grammar rule III, and the input sentence "I eat the pizza with pineapple." meet the grammar rule IV.

Therefore, when the plurality of the grammar rule described above are used to determine that the part of speech of the adjacent lexicons corresponds to the preset part of speech, the phrase is determined, and the corresponding part of speech sequence of multiple lexicons in the table block is also determined. It solves the problem of ambiguity caused by multiple meanings of a lexicon when parsing the input sentence.

In some embodiments, the grammar rule of the semantic processing method includes filtering the inappropriate part of speech sequence when generating the plurality of the part of speech sequences corresponding to the plurality of lexicons. In one embodiment, the grammar rule "SS (Word.Subj@S==not)→S" determines whether the subtree S on the right side of the table block and the subtree Subj of the table block have a vocabulary "not". When the result of the determination is yes, the part of speech sequence is kept. Consequently, in the case of considering the part of speech of a plurality of lexicons, the embodiments of the present disclosure may further filter out inappropriate parse trees (such as, the parse tree does not conform to the language of expression or human expression) before generating the parsing result to reduce the amount of computation in the future of the parse tree.

Continue to refer to FIG. 1. Then in step S111, output the parse tree according to the table blocks in the lexicon table that meets the grammar rules. In an embodiment, each of the grammar rules has a weight value, and the weight value is added when the table block meets the grammar rule. Therefore, after all the grammar rules have been performed, at least one parse tree is obtained, and each parse tree has a corresponding sum of weight values. The semantic processing method 100 selects the highest sum of weight values as an output parse tree and simultaneously outputs the logical form graph of the parse tree with the highest sum.

Figure 7A:
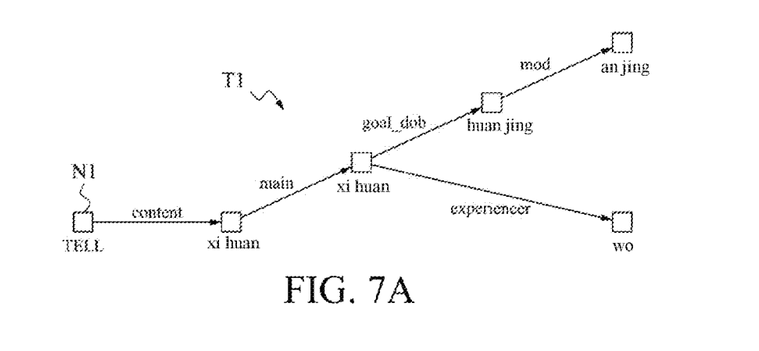
FIG. 7A to FIG. 7B are schematic diagrams of generating parsing results according to some embodiments of the disclosure.
Figure 7B:
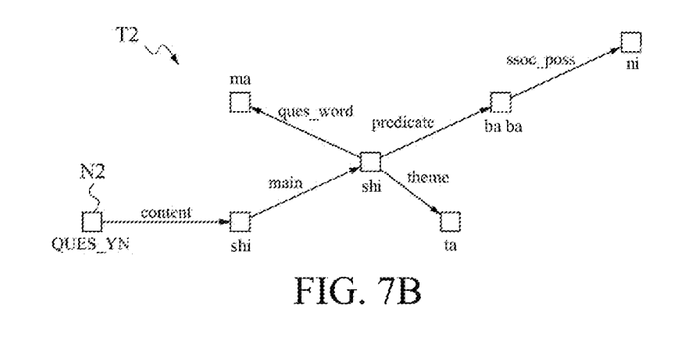

FIG. 7A to FIG. 7B are schematic diagrams of generating parsing results (a logical form T1 of a parse tree or a logical form T2 of a parse tree) according to some embodiments of the disclosure.

The following takes an input sentence "wo xi huan an jing de huan jing" for example. The result of the parsing produced by the semantic processing method includes meanings of the lexicons in the input sentence and a sentence behavior of the input sentence. As shown in FIG. 7A, node N1 of logical form T1 represents the sentence behavior, and TELL indicates that the sentence behavior is a declarative sentence. In the process of parsing, the meanings of the node (such as "wo", "xi huan") are determined. The connection edges between node and node is semantic roles (such as content, main, goal_dob, mod, and experiencer, which represent the semantic roles between nodes). For example, the node "xi huan" is a verb that belongs to a user, so after completing the parsing, the semantic role is assigned to connect the node "xi huan" and the node "wo".

The following is another input sentence "ta shi ni ba ba ma?" to explain the meanings and the sentence behavior of the parse tree and. As shown in the logical form T2 shown in FIG. 7B, the node N2 represents the sentence behavior, and QUES_YN indicates that the sentence behavior belongs to a question. Similar to the description in FIG. 7A, the meanings of the nodes (such as "shi", "ba ba") are determined during the parsing process, and the connection lines between the nodes and the nodes are the semantic roles (such as content, main, theme, predicate, ssoc_poss, and ques_word, which represent the semantic roles between nodes).

Figure 8:
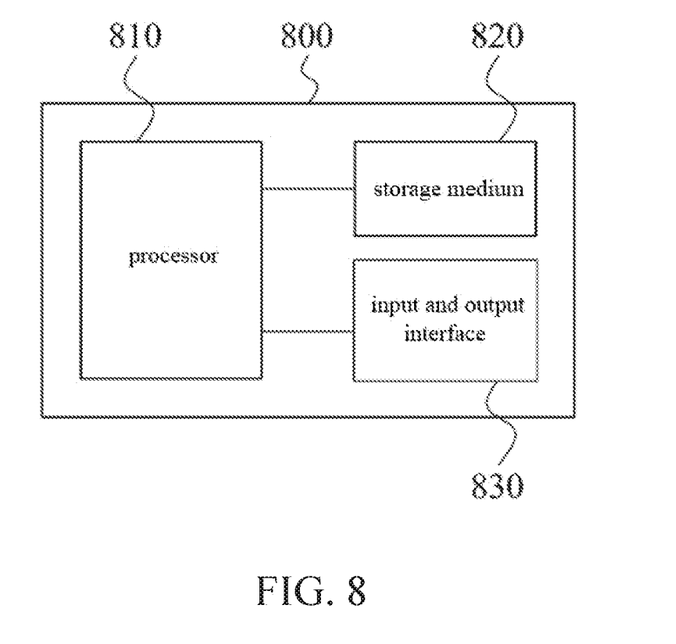
FIG. 8 is a functional block diagram of an electronic device according to an embodiment of the disclosure.

Please refer to FIG. 8, which is a functional block diagram of an electronic device 800 according to an embodiment of the disclosure. The electronic device 800 includes a processor 810, a storage medium 820, and an input and output interface 830. The processor 810 is electrically connected to the storage medium 820 and the input and output interface 830. The processor 810 is configured to load the program instruction (which is a software or firmware) to perform the semantic processing method 100 of FIG. 1 and the described embodiments.

A user inputs a text, a voice, or a file content to be processed to the electronic device 800 through the input and output interface 830. After the electronic device 800 generates a parse tree corresponding to the input sentence, the electronic device 800 generates a correct response or subsequent processing for the user's input. For example, the electronic device 800 understands the semantics of the user and automatically generates a conversation response, or the electronic device 800 understands the user's input instructions to help the user to make a call, preset an alarm clock, reply to a newsletter, buy or sell goods, or translate a language.

The program instruction is stored in the storage medium 820. The storage medium 820 is a random access memory (RAM), a read-only memory (ROM), a solid state drive (SSD), or similar components of other computer readable recording medium. The processor 810 is a central processing unit (CPU), a system on chip (SoC), a digital signal processor, or a processing chip or a controller with a specific function. The semantic processing method 100 in the embodiments is implemented in any kind of programming language. In one embodiment, the present disclosure provides a non-transitory computer readable recording medium, and the non-transitory computer readable recording medium records the program instruction, and the program instruction is loaded into the electronic device 800 to perform the semantic processing method 100 in the embodiments.

In summary, the electronic device and the semantic processing method thereof in the disclosure, consider the possibilities of multiple lexicons segmented based on the use of the lexicon table before entering the grammar parse, and the possibilities are considered in the grammar parse. Therefore, when performing the grammar parse, the meanings and parts of speech of a plurality of lexicon combinations are simultaneously analyzed, the result of the grammar parse is more accurate, and therefore the meaning of the statement entered by the user is analyzed correctly by the electronic device. In addition, the grammar rules of the semantic processing method filter out lexicons, lexicon combinations, or part of speech combinations that do not need to be considered in advance, thereby reducing ambiguity of sentence structure and avoiding the problem of word sense disambiguation (WSD). Moreover, the electronic device and the semantic processing method thereof in the disclosure assign the semantic roles in the grammar parse stage, so that the correct parse tree is generated finally, and the correctness of the parsing result is increased.

Although the present disclosure has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A semantic processing method, applied to an electronic device, the semantic processing method comprising:

segmenting, by a processor, an input sentence into a plurality of lexicons according to a lexicon database which is stored in a memory, wherein each of the lexicons includes a single word or a plurality of adjacent words;

establishing, by the processor, a lexicon table, wherein the lexicon table includes a plurality of table blocks, and the plurality of the table blocks are respectively located at a plurality of levels of the lexicon table, a number of the table blocks at each level decreases level by level, and each of the table blocks includes the single word of the lexicon or the plurality of adjacent words of the lexicon;

referring, by the processor, one part of speech or a plurality of parts of speech (POS), corresponding to one of the lexicons of the table blocks, in the lexicon database, or referring one part of speech sequence or a plurality of part of speech sequences, corresponding to of the plurality of lexicons of table blocks, in the lexicon database;

performing, by the processor, at least one grammar rule for each of the table blocks of the levels according to the part of speech, the plurality of parts of speech, the part of speech sequence or the plurality of part of speech sequences corresponding to the table blocks of the lexicon table; and outputting, by the processor, a parse tree according to the table blocks in the lexicon table that conform to the at least one grammar rule for the electronic device to analyze a meaning of an input instruction corresponding to the input sentence correctly, wherein the parse tree includes meanings of lexicons in the input sentence and a sentence behavior of the input sentence, wherein the sentence behavior includes a declarative sentence and a question, wherein the at least one grammar rule includes determining whether a P node exists, and the at least one grammar rule is temporarily passed when the P node exists, wherein after determining the P node exists and the at least one grammar rule was temporarily passed and when a node lexicon of the P node is read in another grammar rule, the passed grammar rule is performed again to determine whether the node lexicon of the P node meets the passed grammar rule.

2. The semantic processing method according to claim 1, wherein the step of segmenting the input sentence into the plurality of lexicons comprises:
placing a preset phrase in one of the table blocks of the lexicon table when it is determined that the input sentence has at least one preset phrase, wherein the preset phrase includes more than two words.

3. The semantic processing method according to claim 1, wherein the at least one grammar rule includes determining whether the part of speech of the table block on a left side of the table blocks of each of the levels of the lexicon table corresponds to a preset part of speech.

4. The semantic processing method according to claim 1, wherein the at least one grammar rule includes determining whether the part of speech of the table block on a right side of the table blocks of each of the levels of the lexicon table corresponds to a preset part of speech.

5. The semantic processing method according to claim 1, wherein the at least one grammar rules includes determining whether the part of speech of a specified table block of the lexicon table corresponds to a preset POS, wherein a lexicon of the specified table block and the lexicon of at least one adjacent table block jointly compose a lexicon combination.

6. The semantic processing method according to claim 1, wherein the at least one grammar rule determines whether the part of speech of a plurality of adjacent lexicons of a lexicon block of the lexicon table corresponds to a preset part of speech, wherein when the part of speech of the adjacent lexicons of the lexicon block of the lexicon table corresponds to the preset part of speech, it is determined the adjacent lexicons of the lexicon block of the lexicon table jointly form a phrase.

7. The semantic processing method according to claim 1, wherein each of the at least one grammar rule has a weight value, and the weight value is added when the table block of the lexicon table meets the grammar rule, wherein after all of the at least one grammar rules has been performed, at least one parse tree is obtained, each of the at least one parse tree is having a corresponding sum of weight values, and the parse tree with the highest value of the weight is output.

8. The semantic processing method according to claim 1, wherein a number of the lexicons parsed from the input sentence is a number of the table blocks of the lexicon table.

9. An electronic device comprising:
a memory storage medium, storing at least one program instruction and a lexicon database;
an input and output interface, for obtaining an input sentence; and
a processor, coupled to the storage medium and the input and output interface, the processor is configured to load and perform the at least one program instruction stored in the storage medium, the processor performs the following steps:
segmenting an input sentence into a plurality of lexicons according to the lexicon database which is stored in the memory, wherein each of the lexicons includes a single word or a plurality of adjacent words;
establishing a lexicon table, wherein the lexicon table includes a plurality of table blocks, and the plurality of the table blocks are respectively located at a plurality of levels of the lexicon table, a number of the table blocks at each level decreases level by level, and each of the table blocks includes the single word of the lexicon or the plurality of adjacent words of the lexicon;
referring one part of speech or a plurality of parts of speech, corresponding to one of the lexicons of the table blocks, in the lexicon database, or referring one part of speech sequence or a plurality of part of speech sequences, corresponding to of the plurality of lexicons of table blocks, in the lexicon database;
performing at least one grammar rule for each of the table blocks of the levels according to the part of speech, the plurality of parts of speech, the part of speech sequence or the plurality of part of speech sequences corresponding to the table blocks of the lexicon table;
outputting a parse tree according to the table blocks in the lexicon table that conform to the at least one grammar rule for the electronic device to analyze a meaning of an input instruction corresponding to the input sentence correctly, wherein the parse tree includes meanings of lexicons in the input sentence and a sentence behavior of the input sentence, wherein the sentence behavior includes a declarative sentence and a question;
determining whether a P node exists, and the at least one grammar rule is temporarily passed when the P node exists; and
performing passed grammar rule again to determine whether a node lexicon of the P node meet the passed grammar rule after determining the P node exists and the at least one grammar rule was temporarily passed and when a node lexicon of the P node is read in another grammar rule.

10. The electronic device according to claim 9, wherein the processor further performs the following step:
placing a preset phrase in one of the table blocks of the lexicon table when it is determined that the input sentence has at least one preset phrase, wherein the preset phrase includes more than two words.

11. The electronic device according to claim 9, wherein the processor further performs the following step:
determining whether the part of speech of the table block on a left side of the table blocks of each of the levels of the lexicon table corresponds to a preset part of speech.

12. The electronic device according to claim 9, wherein the processor further performs the following step:
determining whether the part of speech of the table block on a right side of the table blocks of each of the levels of the lexicon table corresponds to a preset part of speech.

13. The electronic device according to claim 9, wherein the processor further performs the following step:
determining whether the part of speech of a plurality of adjacent lexicons of a lexicon block of the lexicon table corresponds to a preset part of speech, wherein when the part of speech of the adjacent lexicons of the lexicon block of the lexicon table corresponds to the preset part of speech, it is determined the adjacent lexicons of the lexicon block of the lexicon table jointly form a phrase.

14. The electronic device according to claim 9, wherein each of the at least one grammar rule has a weight value, and the weight value is added when the table block of the lexicon table meets the grammar rule, wherein after all of the at least one grammar rules has been performed, at least one parse tree is obtained, each of the at least one parse tree is having a corresponding sum of weight values, and the parse tree with the highest value of the weight is output.

15. The electronic device according to claim 9, wherein a number of the multiple lexicons parsed from the input sentence by the processor is a number of the table blocks of the lexicon table.

16. A non-transitory computer readable recording medium, the non-transitory computer readable recording medium records a program instruction, and the program instruction is loaded into an electronic device to perform the following steps:
  segmenting, by a processor, an input sentence into a plurality of lexicons according to a lexicon database which is stored in a memory, wherein each of the lexicons includes a single word or a plurality of adjacent words;
  establishing, by the processor, a lexicon table, wherein the lexicon table includes a plurality of table blocks, and the plurality of the table blocks are respectively located at a plurality of levels of the lexicon table, a number of the table blocks at each level decreases level by level, and each of the table blocks includes the single word of the lexicon or the plurality of adjacent words of the lexicon;
  referring, by the processer, one part of speech or a plurality of parts of speech, corresponding to one of the lexicons of the table blocks, in the lexicon database, or referring one part of speech sequence or a plurality of part of speech sequences, corresponding to of the plurality of lexicons of table blocks, in the lexicon database;
  performing, by the processer, at least one grammar rule for each of the table blocks of the levels according to the part of speech, the plurality of parts of speech, the part of speech sequence or the plurality of part of speech sequences corresponding to the table blocks of the lexicon table; and
  outputting, by the processer, a parse tree according to the table blocks in the lexicon table that meet the at least one grammar rule for the electronic device to analyze a meaning of an input instruction corresponding to the input sentence correctly, wherein the parse tree includes meanings of lexicons in the input sentence and a sentence behavior of the input sentence, wherein the sentence behavior includes a declarative sentence and a question, wherein the at least one grammar rule includes determining whether a P node exists, and the at least one grammar rule is temporarily passed when the P node exists, wherein after determining the P node exists and the at least one grammar rule was temporarily passed and when a node lexicon of the P node is read in another grammar rule, the passed grammar rule is performed again to determine whether the node lexicon of the P node meets the passed grammar rule.

* * * * *

UNITED STATES PATENT AND TRADEMARK OFFICE
CERTIFICATE OF CORRECTION

| | |
|---|---|
| PATENT NO. | : 11,501,077 B2 |
| APPLICATION NO. | : 16/576903 |
| DATED | : November 15, 2022 |
| INVENTOR(S) | : Parng et al. |

It is certified that error appears in the above-identified patent and that said Letters Patent is hereby corrected as shown below:

In the Drawings

Please replace Figs. 4,5 with Figs. 4,5 as shown on the attached page.

Signed and Sealed this
Twenty-first Day of February, 2023

Katherine Kelly Vidal
*Director of the United States Patent and Trademark Office*

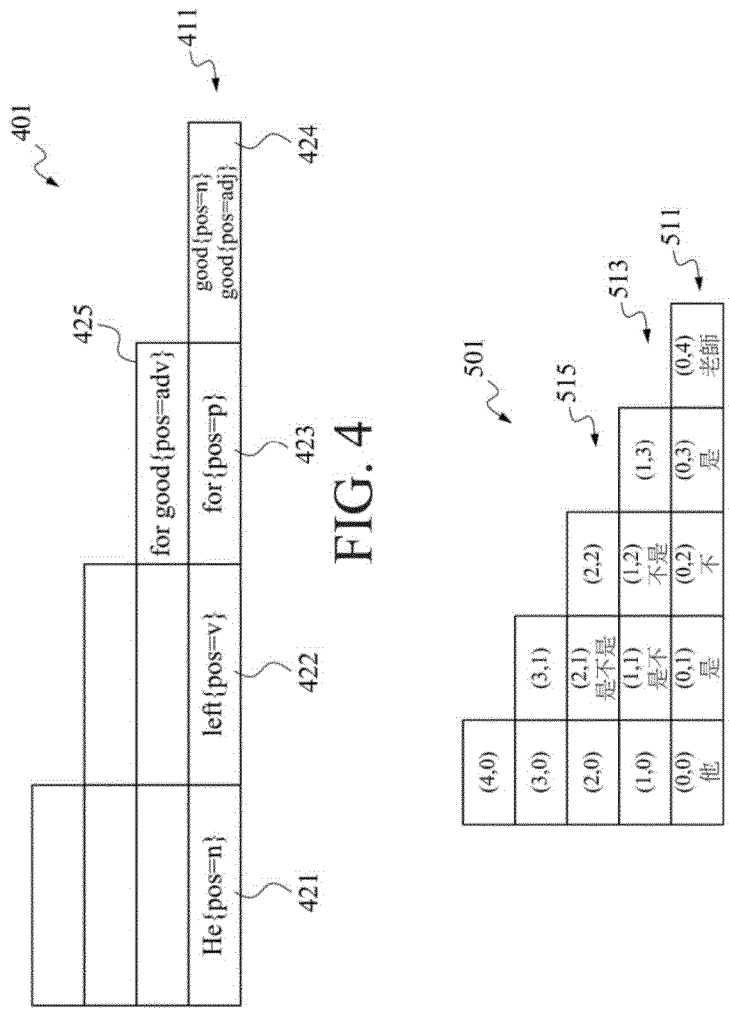
FIG. 4
FIG. 5